(12) United States Patent
    Norair

(10) Patent No.: US 8,718,551 B2
(45) Date of Patent: May 6, 2014

(54) METHOD AND APPARATUS FOR A MULTI-BAND, MULTI-MODE SMARTCARD

(75) Inventor: John Peter Norair, San Francisco, CA (US)

(73) Assignee: Blackbird Technology Holdings, Inc., Dover, DE (US)

( * ) Notice: Subject to any disclaimer, the term of this patent is extended or adjusted under 35 U.S.C. 154(b) by 180 days.

(21) Appl. No.: 13/270,802

(22) Filed: Oct. 11, 2011

(65) Prior Publication Data

US 2012/0088449 A1     Apr. 12, 2012

Related U.S. Application Data

(60) Provisional application No. 61/404,840, filed on Oct. 12, 2010.

(51) Int. Cl.
    *H04B 5/00*     (2006.01)
(52) U.S. Cl.
    USPC ............................................ 455/41.1
(58) Field of Classification Search
    USPC ............................................ 455/41.1
    See application file for complete search history.

(56) References Cited

U.S. PATENT DOCUMENTS

| | | | |
|---|---|---|---|
| 5,338,625 A | 8/1994 | Bates | |
| 5,729,557 A | 3/1998 | Gardner et al. | |
| 5,959,281 A | 9/1999 | Domiteaux | |
| 6,115,379 A | 9/2000 | Flanders et al. | |
| 6,307,846 B1 | 10/2001 | Willey | |
| 6,330,700 B1 | 12/2001 | Morris | |
| 6,381,243 B1 | 4/2002 | Ekstedt | |
| 6,388,997 B1 | 5/2002 | Scott | |
| 6,424,301 B1 | 7/2002 | Johnson | |
| 6,452,569 B1 | 9/2002 | Park | |
| 6,549,959 B1 | 4/2003 | Yates et al. | |

(Continued)

FOREIGN PATENT DOCUMENTS

| | | |
|---|---|---|
| EP | 1321009 B1 | 1/2007 |
| WO | 2006001556 A1 | 1/2006 |
| WO | 2009023592 A2 | 2/2009 |

OTHER PUBLICATIONS

PCT International Searching Authority, Notification Concerning Transmittal of the International Search Report and The Written Opinion of the International Searching Authority, or the Declaration, in International application No. PCT/US11/55934, dated Mar. 6, 2012 (11 pages).

(Continued)

*Primary Examiner* — April G Gonzales
(74) *Attorney, Agent, or Firm* — McAndrews, Held & Malloy, Ltd.

(57) ABSTRACT

Aspects of a method and apparatus for a multi-band, multi-mode smartcard are provided. An ISO 7816 compliant smartcard may comprise a near-field radio operable to communicate wirelessly, a far-field radio operable to communicate wirelessly, and a contact-based radio operable to communicate via one or more metal contacts of the smartcard. The smartcard may be operable to receive data via a first one of the far-field radio, the near-field radio, and the contact-based radio, and transmit the received data via a second one of the far-field radio, the near-field radio, and the contact-based radio. The smartcard may be operable to transcode the received data prior to the transmitting the received data via the second one of the far-field radio, the near-field radio, and the contact-based radio.

17 Claims, 10 Drawing Sheets

(56) References Cited

U.S. PATENT DOCUMENTS

| | | |
|---|---|---|
| 6,665,308 B1 | 12/2003 | Rakib |
| 6,700,491 B2 | 3/2004 | Shafer |
| 6,705,531 B1 | 3/2004 | Norton |
| 6,714,559 B1 | 3/2004 | Meier |
| 6,771,985 B1 | 8/2004 | Iinuma |
| 7,233,603 B2 | 6/2007 | Lee |
| 7,280,555 B2 | 10/2007 | Stanforth |
| 7,305,237 B2 | 12/2007 | Stephens |
| 7,308,103 B2 | 12/2007 | Corcoran et al. |
| 7,315,248 B2 | 1/2008 | Egbert |
| 7,330,446 B2 | 2/2008 | Lee |
| 7,369,512 B1 | 5/2008 | Shurbanov et al. |
| 7,606,256 B2 | 10/2009 | Vitebsky |
| 7,643,509 B2 | 1/2010 | Han et al. |
| 7,672,284 B2 | 3/2010 | Sugar et al. |
| 7,689,195 B2 | 3/2010 | Wu |
| 7,698,463 B2 | 4/2010 | Ogier et al. |
| 7,735,116 B1 | 6/2010 | Gauvin |
| 7,760,689 B2 | 7/2010 | Shin |
| 7,805,129 B1 | 9/2010 | Issa |
| 7,814,107 B1 | 10/2010 | Thirumalai et al. |
| 7,890,839 B2 | 2/2011 | Iwami |
| 7,962,361 B2 | 6/2011 | Ramchandani |
| 8,036,715 B2 | 10/2011 | Buck |
| 8,351,409 B2 | 1/2013 | Albert |
| 2002/0025823 A1 | 2/2002 | Hara |
| 2002/0078045 A1 | 6/2002 | Dutta |
| 2003/0115369 A1 | 6/2003 | Walter |
| 2003/0154243 A1 | 8/2003 | Crockett |
| 2003/0183691 A1 | 10/2003 | Lahteenmaki |
| 2004/0157631 A1 | 8/2004 | Stobart |
| 2004/0218557 A1 | 11/2004 | Kim et al. |
| 2005/0078038 A1 | 4/2005 | Takaki |
| 2005/0083943 A1 | 4/2005 | Lee et al. |
| 2005/0128086 A1 | 6/2005 | Brown |
| 2005/0135291 A1 | 6/2005 | Ketchum et al. |
| 2005/0139685 A1 | 6/2005 | Kozlay |
| 2005/0174953 A1 | 8/2005 | Ho |
| 2005/0177633 A1 | 8/2005 | Plunkett |
| 2006/0002312 A1 | 1/2006 | Delattre et al. |
| 2006/0061795 A1 | 3/2006 | Walmsley |
| 2006/0088021 A1 | 4/2006 | Nelson et al. |
| 2006/0091223 A1* | 5/2006 | Zellner et al. ............... 235/492 |
| 2006/0175420 A1 | 8/2006 | Satou |
| 2006/0219776 A1 | 10/2006 | Finn |
| 2006/0220867 A1 | 10/2006 | Dixon |
| 2007/0000316 A1 | 1/2007 | Lauer |
| 2007/0010928 A1 | 1/2007 | Brusarosco |
| 2007/0083924 A1 | 4/2007 | Lu |
| 2007/0099641 A1 | 5/2007 | Lastinger |
| 2007/0125836 A1 | 6/2007 | McAllister et al. |
| 2007/0136509 A1 | 6/2007 | Agami |
| 2007/0211532 A1 | 9/2007 | Gonzalez et al. |
| 2007/0232281 A1 | 10/2007 | Nakai |
| 2007/0295074 A1 | 12/2007 | Kobayakawa |
| 2008/0041936 A1 | 2/2008 | Vawter |
| 2008/0069097 A1 | 3/2008 | Motegi |
| 2008/0075123 A1 | 3/2008 | Fourcand |
| 2008/0107060 A1 | 5/2008 | Andou et al. |
| 2008/0130597 A1 | 6/2008 | Kalhan |
| 2008/0164325 A1 | 7/2008 | Borracci |
| 2008/0172357 A1 | 7/2008 | Rechis |
| 2008/0186857 A1 | 8/2008 | Becker |
| 2008/0186867 A1 | 8/2008 | Shoo et al. |
| 2008/0209322 A1 | 8/2008 | Kaufman |
| 2008/0228592 A1 | 9/2008 | Kotas |
| 2008/0256409 A1 | 10/2008 | Oran et al. |
| 2008/0302177 A1 | 12/2008 | Sinnett |
| 2008/0320139 A1 | 12/2008 | Fukuda |
| 2009/0003376 A1 | 1/2009 | Horvat |
| 2009/0034491 A1 | 2/2009 | Adams |
| 2009/0055377 A1 | 2/2009 | Hedge |
| 2009/0069049 A1* | 3/2009 | Jain ............................ 455/558 |
| 2009/0073070 A1 | 3/2009 | Rofougaran |
| 2009/0113267 A1 | 4/2009 | Harrison |
| 2009/0138948 A1 | 5/2009 | Calamera |
| 2009/0141531 A1 | 6/2009 | Abedin |
| 2009/0150646 A1 | 6/2009 | Allen |
| 2009/0171749 A1 | 7/2009 | Laruelle |
| 2009/0171947 A1 | 7/2009 | Karayel |
| 2009/0210898 A1 | 8/2009 | Childress et al. |
| 2009/0251295 A1 | 10/2009 | Norair |
| 2009/0268674 A1 | 10/2009 | Liu |
| 2009/0279652 A1 | 11/2009 | Sinha |
| 2009/0286496 A1 | 11/2009 | Yavuz et al. |
| 2009/0292418 A1 | 11/2009 | Kuykendal |
| 2010/0011156 A1 | 1/2010 | Yim |
| 2010/0026589 A1 | 2/2010 | Dou |
| 2010/0027558 A1 | 2/2010 | Han |
| 2010/0052859 A1 | 3/2010 | Lossau |
| 2010/0078471 A1 | 4/2010 | Lin |
| 2010/0082893 A1 | 4/2010 | Ma et al. |
| 2010/0097946 A1 | 4/2010 | Celentano |
| 2010/0097956 A1 | 4/2010 | Tauil |
| 2010/0097957 A1 | 4/2010 | Pirzada et al. |
| 2010/0118737 A1 | 5/2010 | Kim |
| 2010/0177696 A1 | 7/2010 | Jung |
| 2010/0179877 A1 | 7/2010 | Lam |
| 2010/0181377 A1 | 7/2010 | Chen |
| 2010/0190437 A1 | 7/2010 | Buhot |
| 2010/0197261 A1 | 8/2010 | Zibrik et al. |
| 2010/0228617 A1 | 9/2010 | Ransom et al. |
| 2010/0232408 A1 | 9/2010 | Lim |
| 2010/0256976 A1 | 10/2010 | Atsmon |
| 2010/0280904 A1 | 11/2010 | Ahuja |
| 2010/0295681 A1 | 11/2010 | Burns et al. |
| 2011/0003607 A1 | 1/2011 | Forenza et al. |
| 2011/0007733 A1 | 1/2011 | Kubler et al. |
| 2011/0074552 A1 | 3/2011 | Norair |
| 2011/0112892 A1 | 5/2011 | Tarantino |
| 2012/0001730 A1 | 1/2012 | Potyrailo |
| 2012/0086615 A1 | 4/2012 | Norair |
| 2012/0087267 A1 | 4/2012 | Norair |
| 2012/0087350 A1 | 4/2012 | Norair |
| 2012/0116694 A1 | 5/2012 | Norair |
| 2012/0116887 A1 | 5/2012 | Norair |
| 2012/0118952 A1 | 5/2012 | Norair |
| 2012/0191848 A1 | 7/2012 | Norair |
| 2012/0191901 A1 | 7/2012 | Norair |
| 2012/0207141 A1 | 8/2012 | Norair |
| 2012/0209716 A1 | 8/2012 | Burns |
| 2012/0224491 A1 | 9/2012 | Norair |
| 2012/0224530 A1 | 9/2012 | Norair |
| 2012/0224543 A1 | 9/2012 | Norair |
| 2012/0224590 A1 | 9/2012 | Norair |
| 2012/0225687 A1 | 9/2012 | Norair |
| 2012/0226822 A1 | 9/2012 | Norair |
| 2012/0226955 A1 | 9/2012 | Norair |
| 2013/0017788 A1 | 1/2013 | Norair |

OTHER PUBLICATIONS

Int'l Prelimianry Report on Patentability for PCT/US2011/055934 dated Apr. 25, 2013.

PCT International Searching Authority, Notification Concerning Transmittal of the International Search Report and The Written Opinion of the International Searching Authority, or the Declaration, in International application No. PCT/US2011/55118, dated Feb. 28, 2012. (25 pages).

PCT International Searching Authority, Notification Concerning Transmittal of the International Search Report and The Written Opinion of the International Searching Authority, or the Declaration, in International application No. PCT/US11/055082, dated Mar. 1, 2012. (13 pages).

PCT International Searching Authority, Notification Concerning Transmittal of the International Search Report and The Written Opinion of the International Searching Authority, or the Declaration, in International application No. PCT/US2011/055929, dated Jan. 30, 2012. (15 pages).

PCT International Searching Authority, Notification Concerning Transmittal of the International Search Report and The Written Opinion of the International Searching Authority, or the Declaration, in International application No. PCT/US2011/059292, dated Feb. 2, 2012. (12 pages).

(56) References Cited

OTHER PUBLICATIONS

PCT International Searching Authority, Notification Concerning Transmittal of the International Search Report and The Written Opinion of the International Searching Authority, or the Declaration, in International application No. PCT/US11/059304, dated Mar. 9, 2012. (11 pages).
PCT International Searching Authority, Notification Concerning Transmittal of the International Search Report and The Written Opinion of the International Searching Authority, or the Declaration, in International application No. PCT/US2011/060950, dated Mar. 16, 2012. (14 pages).
PCT International Searching Authority, Notification Concerning Transmittal of the International Search Report and The Written Opinion of the International Searching Authority, or the Declaration, in International application No. PCT/US12/22005, dated Mar. 29, 2012. (12 pages).
PCT International Searching Authority, Notification Concerning Transmittal of the International Search Report and The Written Opinion of the International Searching Authority, or the Declaration, in International application No. PCT/US12/22002, dated May 8, 2012. (13 pages).
PCT International Searching Authority, Notification Concerning Transmittal of the International Search Report and The Written Opinion of the International Searching Authority, or the Declaration, in International application No. PCT/US2012/025191 dated May 25, 2012 (8 pages).
PCT International Searching Authority, Notification Concerning Transmittal of the International Search Report and The Written Opinion of the International Searching Authority, or the Declaration, in International application No. PCT/US2012/025197 dated May 25, 2012 (7 pages).
PCT International Searching Authority, Notification Concerning Transmittal of the International Search Report and The Written Opinion of the International Searching Authority, or the Declaration, in International application No. PCT/US2012/027382 dated May 31, 2012 (10 pages).
PCT International Searching Authority, Notification Concerning Transmittal of the International Search Report and The Written Opinion of the International Searching Authority, or the Declaration, in International application No. PCT/US2012/027381 dated May 31, 2012 (13 pages).
PCT International Searching Authority, Notification Concerning Transmittal of the International Search Report and The Written Opinion of the International Searching Authority, or the Declaration, in International application No. PCT/US2012/027387 dated Jun. 6, 2012 (14 pages).
PCT International Searching Authority, Notification Concerning Transmittal of the International Search Report and The Written Opinion of the International Searching Authority, or the Declaration, in International application No. PCT/US2012/27378 dated Jun. 13, 2012 (14 pages).
PCT International Searching Authority, Notification Concerning Transmittal of the International Search Report and The Written Opinion of the International Searching Authority, or the Declaration, in International application No. PCT/US2012/027379 dated Jun. 20, 2012 (16 pages).
PCT International Searching Authority, Notification Concerning Transmittal of the International Search Report and The Written Opinion of the International Searching Authority, or the Declaration, in International application No. PCT/US2012/027384 dated Jun. 20, 2012 (10 pages).
PCT Int'l Searching Authority, Notification Concerning Transmittal of the Int'l Search Report and The Written Opinion of the Int'l Searching authority or the Declaration in Int'l application No. PCT/US2012/027386 dated Oct. 16, 2012.
Int'l Prelim. Report on Patentability for PCT/US2011/055082 dated Apr. 18, 2013.

* cited by examiner

METHOD AND APPARATUS FOR A MULTI-BAND, MULTI-MODE SMARTCARD

CLAIM OF PRIORITY

This patent application makes reference to, claims priority to and claims benefit from U.S. Provisional Patent Application Ser. No. 61/404,840 filed on Oct. 12, 2010.

The above priority application is hereby incorporated herein by reference in its entirety.

INCORPORATION BY REFERENCE

This patent application also makes reference to:
U.S. Provisional Patent Application No. 61/464,376 filed on Mar. 2, 2011;
U.S. patent application Ser. No. 13/267,640 filed on Oct. 6, 2011;
U.S. patent application Ser. No. 13/267,621 filed on Oct. 6, 2011; and
U.S. Provisional Patent Application No. 61/404,842 filed on Oct. 12, 2010

Each of the above-referenced applications is hereby incorporated herein by reference in its entirety.

FIELD OF THE INVENTION

Certain embodiments of the invention relate to communications. More specifically, certain embodiments of the invention relate to a method and apparatus for a multi-band, multi-mode smartcard.

BACKGROUND OF THE INVENTION

Existing smartcards are limited in terms of security, functionality, and flexibility. Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for a multi-band, multi-mode smartcard, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms "block" and "module" refer to functions than can be implemented in hardware, software, firmware, or any combination of one or more thereof. As utilized herein, the term "exemplary" means serving as a non-limiting example, instance, or illustration. As utilized herein, the term "e.g.," introduces a list of one or more non-limiting examples, instances, or illustrations.

Figure 1:
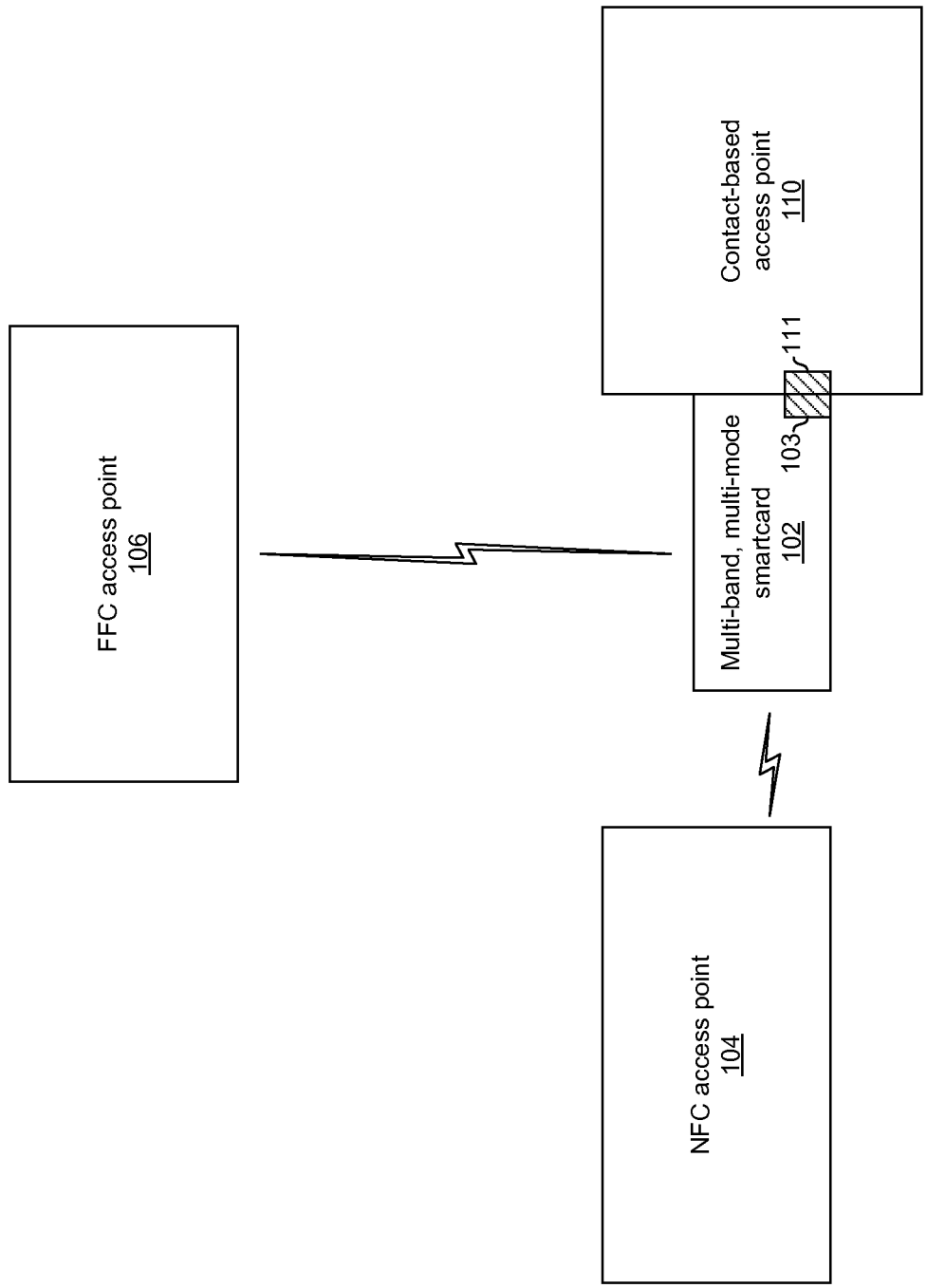
FIG. 1 depicts an exemplary communication system comprising a multi-band, multi-mode smartcard.

FIG. 1 depicts an exemplary communication system comprising a multi-band, multi-mode smartcard. Shown in FIG. 1 is a multi-mode, multi-band smartcard 102, a near-field communications (NFC) access point (AP) 104, a far-field communications (FFC) access point (AP) 106, and a contact-based communications (CCB) access point (AP) 110.

The NFC AP 104 may comprise circuitry operable to communicate in accordance with one or more near-field communication protocols. For example, the NFC AP 104 may comprise a radio operable to communicate in accordance with protocols specified in one or more of: ISO 18092, ISO 14443, and ISO 18000-3.

The FFC AP 106 may comprise circuitry operable to communicate in accordance with one or more far-field communication protocols. For example, the NFC AP 104 may comprise a radio operable to communicate in accordance with protocols specified in ISO 18000-7 and/or in the above-incorporated U.S. Provisional Patent Application 61/464,376 filed on Mar. 2, 2011.

The CBC AP 110 may comprise circuitry, including metal contact(s) 111, operable to communicate via the metal contact(s) 111. For example, the CBC AP 104 may comprise a radio operable to communicate in accordance with specifications set forth in ISO 7816.

The multi-mode, multi-band smartcard 102 may comprise circuitry operable to communicate in accordance with one or more far-field communication protocols (e.g., ISO 18000-7), one or more near-field communication protocols (e.g., ISO 18092, and/or ISO 14443), and one or more contact-based communication protocols (e.g., ISO 7816) via the contact(s) 103. In an exemplary embodiment of the invention, the smartcard may have physical dimensions in compliance with ISO 7816. In other embodiments of the invention, the smartcard may not be a "card" at all but may be, for example, a keyfob or a tag which can be affixed to various tangible goods. Details of an exemplary smartcard 102 are described below with respect to FIG. 2.

In operation, the smartcard 102 may communicate with any one or more of the NFC AP 104 the FFC AP 106 and CBC AP 110. The smartcard 102 may communicate with two or more of the access points sequentially and/or concurrently. The smartcard 102 may, for example, communicate with different access points to perform different tasks and/or communicate different information. The smartcard 102 may, for example, communicate with multiple access points to improve security of communications and/or reliability of communications.

Figure 2:
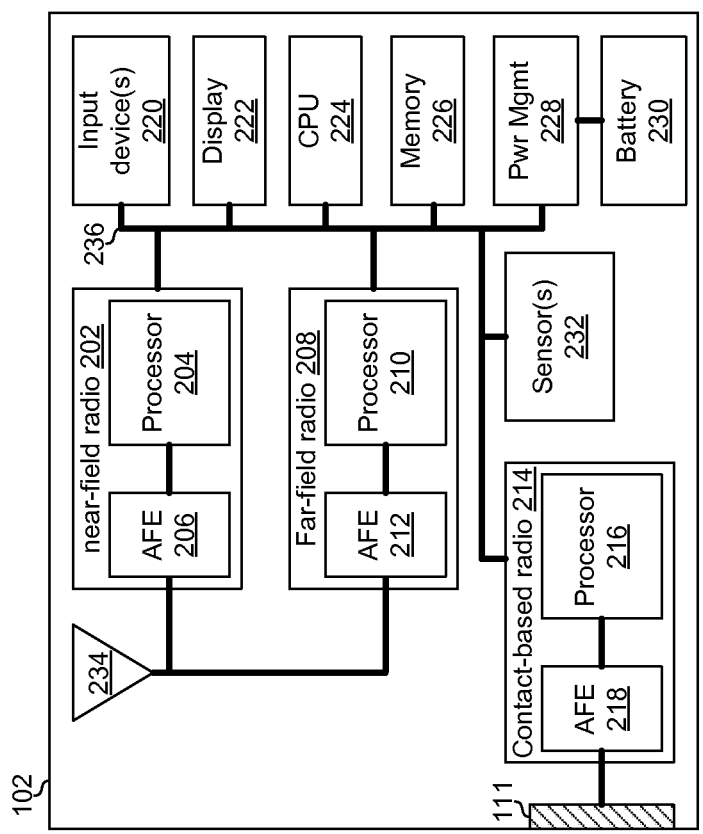
FIG. 2 depicts an exemplary multi-band, multi-mode smartcard.

FIG. 2 depicts an exemplary multi-band, multi-mode smartcard. The exemplary smartcard 102 comprises a near-field radio 202, a far-field radio 208, a contact-based radio 214, input device(s) 220, a display 222, a central processing unit (CPU) 224, a memory 226, a power management module 228, a battery 230, one or more sensors 232, and an antenna 234.

The near-field radio 202 may comprise circuitry operable to communicate in accordance with one or more near-field communication protocols. For example, the near-field radio 202 may comprise an analog front-end (AFE) 206 and a processor 204 operable to communicate in accordance with one or more near-field protocols (e.g., protocols specified in ISO 18092, ISO 14443, and/or ISO 18000-3). The processor 204 may comprise circuitry operable to interface with the AFE 206 to receive and transmit data, and to process received and to-be-transmitted data. For transmission, the processor 204 may be operable to receive data via the bus 236, packetize and/or otherwise process the data to prepare it for transmission in accordance with one or more near-field protocols, and output the data to the AFE 206 for transmission. For reception, the processor 204 may be operable to receive data via the AFE 206, process the received data and output received data onto the bus 236.

The far-field radio 208 may comprise circuitry operable to communicate in accordance with one or more near-field communication protocols. For example, the far-field radio 208 may comprise an analog front-end (AFE) 212 and a processor 210 operable to communicate in accordance with one or more far-field protocols (e.g., protocols specified in ISO 18000-7 and/or in the above-incorporated U.S. Provisional Patent Application 61/464,376 filed on Mar. 2, 2011). The processor 210 may comprise circuitry operable to interface with the AFE 212 to receive and transmit data, and to process received and to-be-transmitted data. For transmission, the processor 210 may be operable to receive data via the bus 236, packetize and/or otherwise process the data to prepare it for transmission in accordance with one or more far-field protocols (e.g., protocols specified in ISO 18000-7 and/or in the above-incorporated U.S. Provisional Patent Application 61/464,376 filed on Mar. 2, 2011), and output the data to the AFE 212 for transmission. For reception, the processor 210 may be operable to receive data via the AFE 212, process the received data and output received data onto the bus 236.

The contact-based radio 214 may comprise circuitry operable to communicate in accordance with one or more near-field communication protocols. For example, the contact-based radio 214 may comprise an analog front-end (AFE) 218 and a processor 216 operable to communicate in accordance with one or more near-field protocols (e.g., protocols specified in ISO 7816). The processor 216 may comprise circuitry operable to interface with the AFE 218 to receive and transmit data, and to process received and to-be-transmitted data. For transmission, the processor 216 may be operable to receive data via the bus 236, packetize and/or otherwise process the data to prepare it for transmission in accordance with one or more near-field protocols, and output the data to the AFE 218 for transmission. For reception, the processor 216 may be operable to receive data via the AFE 218, process the received data and output received data onto the bus 236.

The input device(s) 220 may comprise circuitry operable to receive input from a user of the smartcard 102 and convert the input to digital signals. For example, the input device(s) 220 may comprise one or more hard and/or soft buttons and/or a touchscreen.

The display 222 may comprise circuitry operable to output visual signals to a user of the smartcard. For example, the display 222 may be an OLED or bistable electrophoretic type display.

The CPU 224 may comprise circuitry operable to control operation of the first device 102. The CPU 224 may, for example, execute an operating system and/or other programs. The CPU 224 may generate one or more control signals for controlling the operation of the device 102. The CPU 224 may, for example, control a mode of operation of the device 102.

Circuitry of the memory 226 may comprise one or more memory cells and may be operable to store data to the memory cell(s) and read data from the memory cell(s). The one or more memory cell may comprise one or more volatile memory cells and/or one or more non-volatile memory cells.

The power management module 228 may comprise circuitry operable to manage power allocation and/or power consumption in the smartcard 102. The power management module 228 may be operable to, for example, dim and/or turn off the display when it is not needed, turn off one or more of the sensors 232 when not needed, and/or turn off the input device(s) 220 when not needed. Additionally and/or alternatively, the power management module 208 may control charging of the battery 230. For example, the power management module 208 may comprise a energy harvesting circuitry (e.g., to harvest solar energy, kinetic energy, and/or energy inductively coupled to the power management module 228) for charging the battery 208 and/or powering various components of the smartcard 102. Additionally and/or alternatively, the power management module 208 may be operable to charge the battery 208 and/or power various components of the smartcard 102 via energy received via the contacts 111. In an exemplary embodiment of the invention, certain components and/or functions of the smartcard 102 may be disabled when the smartcard 102 is not receiving power via, for example, inductive coupling and/or the contact(s) 111, and may be enabled when the smartcard is receiving power via, for example, inductive coupling and/or the contact(s) 111.

The battery 230 may, for example, a thin film and/or coin cell battery. In an exemplary embodiment of the invention, the battery may be as described in the above-incorporated U.S. Provisional Patent Application 61/404,842 filed on Oct. 12, 2010.

The sensor(s) 232 may comprise one or more of: an acoustic sensor operable to sense, e.g., amplitude, phase, polarization, spectrum and/or wave velocity of acoustic waves; a chemical operable to sense, e.g., the presence of any one or more elements and/or compounds in solid, gas, and/or liquid form; an electrical sensor operable to detect, e.g., amplitude, phase, polarization, and/or spectrum of a current and/or voltage, conductivity, and/or permittivity; a magnetic sensor operable to, e.g., detect flux, permeability, amplitude, phase, and/or polarization of a magnetic field; a mechanical sensor operable to detect, e.g., position, acceleration, force, stress, pressure, strain, mass, density, moment, torque, shape, roughness, orientation, and/or stiffness; an optical sensor operable to detect, e.g., amplitude, phase, polarization, and/or spectrum of an optical wave, wave velocity, refractive index, emissivity, reflectivity, and/or absorption; and/or a thermal sensor operable to detect, e.g., temperature, flux, specific heat, and/or thermal conductivity. The sensor(s) 232 may, for example, generate an interrupt to the CPU 224 when an alarm condition is present.

The antennas 234 may be operable to transmit and receive electromagnetic signals in one or more frequency bands. In an embodiment of the invention, the antenna 234 may be operable to transmit and receive signals in the ISM frequency band centered at 433.92 MHz and in the ISM frequency band centered at 13.56 MHz.

Figure 3:
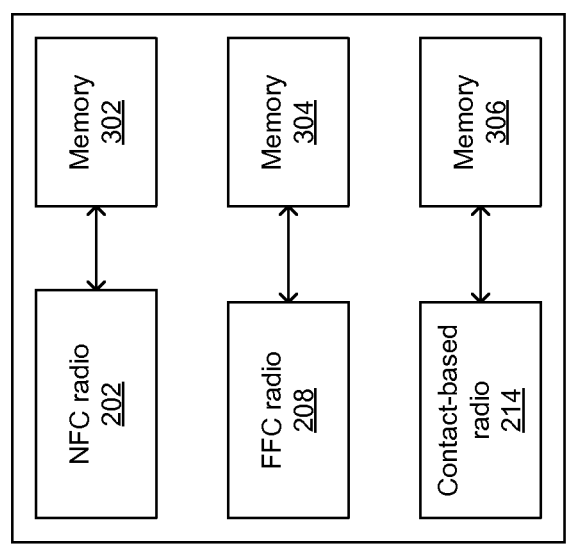
FIG. 3 depicts an exemplary memory partitioning in a multi-band, multi-mode smartcard.

FIG. 3 depicts an exemplary memory partitioning in a multi-band, multi-mode smartcard. Shown in FIG. 3 is the NFC radio 202, the FFC radio 208, the contact-based radio 214, and three portions of memory 302, 304, and 306. The portions of memory 302, 304, and 306 may correspond to logical and/or physical partitions of the memory 226. In an exemplary embodiment of the invention, data stored in the memory portion 302 may only be accessible via the NFC radio 202, data stored in the memory portion 304 may only be accessible via the FFC radio 208, and data stored in the memory portion 306 may only be accessible via the contact-based radio 214.

Partitioning of the memory may enable increased security for the smartcard 102. In an exemplary embodiment, a first portion of a secure message may be stored in the first memory portion 302, a second portion of the secure message may be stored in the second memory portion 304, and neither portion may be useful without the other. In such an embodiment, to obtain the secure data, a device may need to communicate with the smartcard via both the NFC radio and the FFC radio. In another exemplary embodiment, security data for authenticating and/or authorizing a communication may be stored in a first of the memory portions 302, 304, and 306 and general data may be stored in a second of the memory portions 302, 304, and 306. In such an embodiment, a communication device may need to be authenticated and/or authorized via a first of the radios 202, 208, and 214 before it can obtain data via a second one of the radios 202, 208, and 214.

Figure 4:
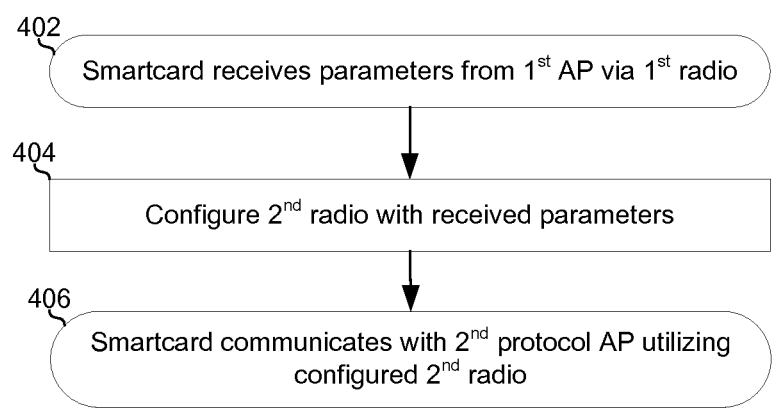
FIG. 4 is a flowchart illustrating exemplary steps for communicating with a multi-band, multi-mode smartcard.

FIG. 4 is a flowchart illustrating exemplary steps for communicating with a multi-band, multi-mode smartcard. The exemplary steps begin with step 402 in which the smartcard receives parameters from a first access point via a first radio. In step 404, a second radio of the smartcard 102 may be configured utilizing the received parameters. For example, transmit levels, modulation, timing, frequency, a scrambling key, a encryption key, and/or encoding utilized for transmission and/or reception via the second radio may be configured. In step 406, the smartcard 102 may communicate via the configured second radio utilizing the received parameters. In an exemplary embodiment of the invention, the parameters may be received from the NFC AP 104 via the near-field radio 202, and be utilized to configure and communicate via the far-field radio 208. In another exemplary embodiment of the invention, the parameters may be received from the FFC AP 104 via the far-field radio 208, and be utilized to configure and communicate via the near-field radio 202. In another exemplary embodiment of the invention, the parameters may be received from the contact-based AP 110 via the contact-based radio 214, and be utilized to configure and communicate via the near-field radio 202. In another exemplary embodiment of the invention, the parameters may be received from the contact-based AP 110 via the contact-based radio 214, and be utilized to configure and communicate via the far-field radio 208. In another exemplary embodiment of the invention, the parameters may be received from the far-field AP 106 via the far-field radio 208, and be utilized to configure and communicate via the contact-based radio 214. In another exemplary embodiment of the invention, the parameters may be received from the near-field AP 104 via the near-field radio 202, and be utilized to configure and communicate via the contact-based radio 214.

Figure 5:
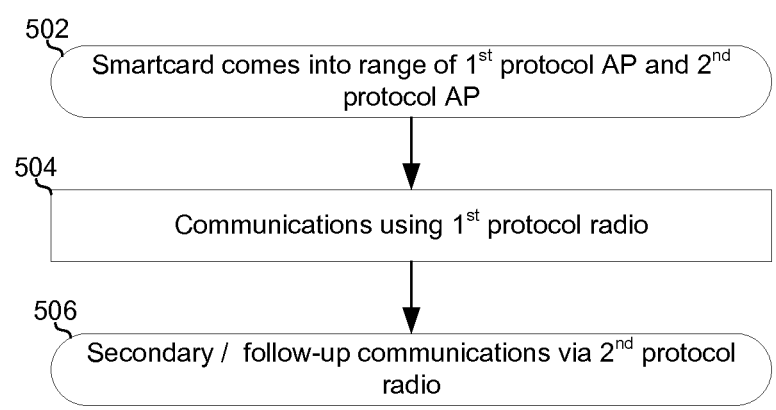
FIG. 5 is a flowchart illustrating exemplary steps for configuring a multi-band, multi-mode smartcard.

FIG. 5 is a flowchart illustrating exemplary steps for configuring a multi-band, multi-mode smartcard. The exemplary steps begin with step 502 in which the smartcard 102 comes within range of a first protocol access point (e.g., a first one of the access points 104, 106, and 110) and a second protocol access point (e.g., a second one of the access points 104, 106, and 110). The smartcard 102 may, for example, detect it is in-range of an access point based on energy-harvesting circuitry accumulating a voltage over a threshold. In step 504, the smartcard 102 may transmit to, and/or receive packets from, the first access point. In step 506, the smartcard 102 may transmit to, and/or receive packets from, the second access point. The one or more packets transmitted to and/or received from the second access point may be secondary to, and/or as a follow-up to, the one or more packets transmitted to, and/or received from, the first access point. As an example, the one or more packets transmitted to and/or received from the second access point may comprise an acknowledgment of the one or more packets received from the first access point. As another example, the one or more packets received from the second access point may be a key to decrypt the one or more packets received from the first access point.

Figure 6:
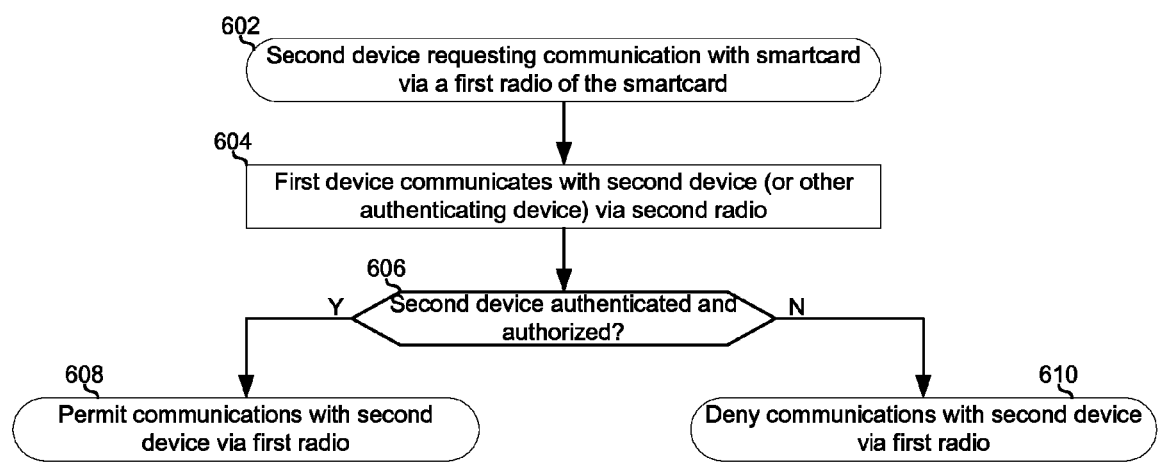
FIG. 6 is a flowchart illustrating exemplary steps for secure communications with a multi-band, multi-mode smartcard.

FIG. 6 is a flowchart illustrating exemplary steps for secure communications with a multi-band, multi-mode smartcard. The exemplary steps may begin with step 602 in which a second device, such as one of the access points 104, 106, and 110, may attempt to communicate with the smartcard 102 via a first one of the radios 202, 208, and 214. In step 604, the smartcard 102 may communicate with the second device utilizing a second one of the radios 202, 208, and 214. In step 606, the smartcard 102 may verify the authenticity of the second device (i.e., whether the second device is what it claims to be), and determine whether the second device is authorized to communicate with the smartcard 102 and/or authorized to access the data in the smartcard 102 that it is attempting to access. If the second device is authenticated and authorized, then in step 608, the smartcard 102 may communicate with the second device via a second one of the radios 202, 208, and 214. Returning to step 606, if the second device is not authenticated and/or not authorized, then in step 610, the smartcard 102 may not respond and/or refuse a connection between the second device and the first one of the radios 202, 208, and 214.

Figure 7A:
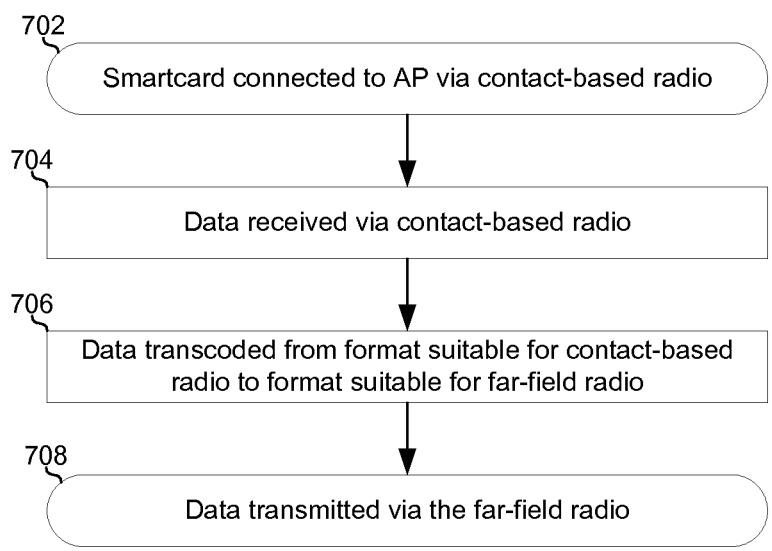
FIG. 7A is a flowchart illustrating exemplary steps for a multi-band, multi-mode smartcard operating as a bridge between two communication protocols.

FIG. 7A is a flowchart illustrating exemplary steps for a multi-band, multi-mode smartcard operating as a bridge between two communication protocols. The exemplary steps may begin with step 702 in which the smartcard 102 may connect to the contact-based AP 110 via the contacts 103 and 111. In step 704, the smartcard 102 may receive data from the AP 110 via the contact-based radio 214. In step 706, the smartcard 102 may transcode the received data. The transcoding may comprise, for example, decapsulating, encapsulating, decoding, encoding, demodulating, modulating, decrypting, encrypting, and/or any other data processing operations to convert the data from a format suitable for communication via the contact-based radio 214 to a format suitable for communication via the far-field radio 208. In step 708, the transcoded data may be transmitted via the far-field radio 208.

Figure 7B:
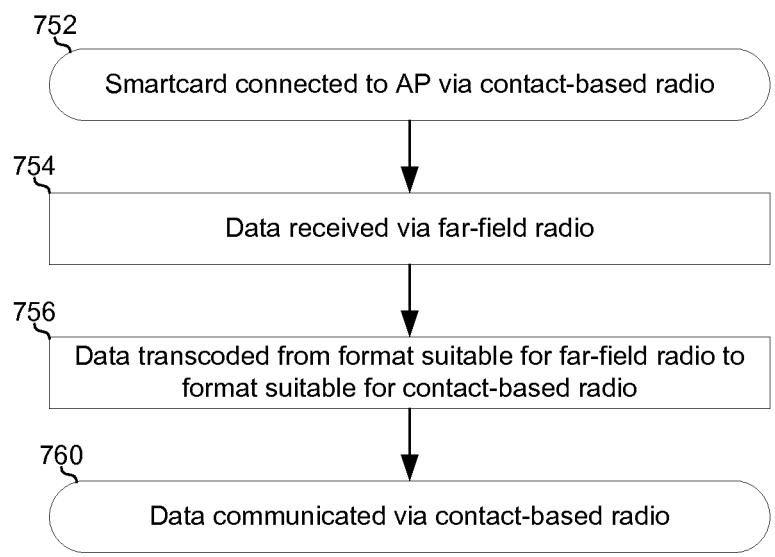
FIG. 7B is a flowchart illustrating exemplary steps for a multi-band, multi-mode smartcard operating as a bridge between two communication protocols.

FIG. 7B is a flowchart illustrating exemplary steps for a multi-band, multi-mode smartcard operating as a bridge between two communication protocols. The exemplary steps may begin with step 752 in which the smartcard 102 may connect to the contact-based AP 110 via the contacts 103 and 111. In step 754, the smartcard 102 may receive data via the far-field radio 208. In step 756, the smartcard 102 may transcode the received data. The transcoding may comprise, for example, decapsulating, encapsulating, decoding, encoding, demodulating, modulating, decrypting, encrypting, and/or any other data processing operations to convert the data from a format suitable for communication via the far-field radio 208 to a format suitable for communication via the contact-based radio 214. In step 758, the transcoded data may be transmitted to the AP 110 via the contact-based radio 214 and the contacts 103 and 111.

Figure 8A:
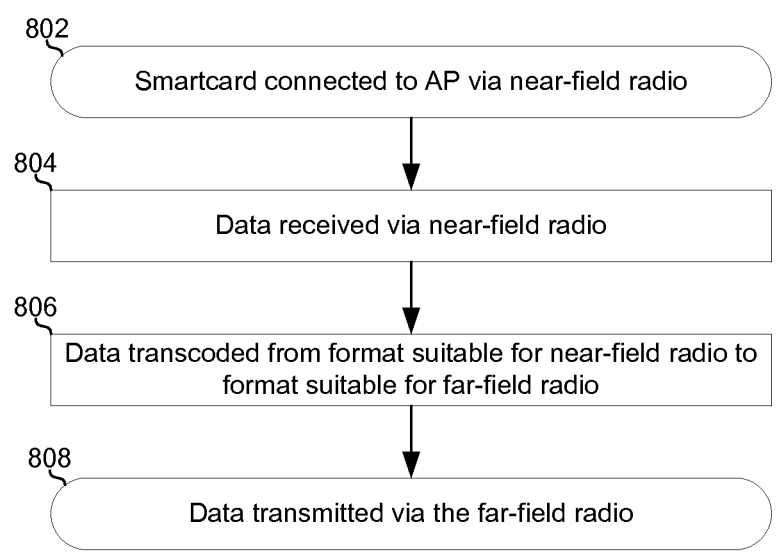
FIG. 8A is a flowchart illustrating exemplary steps for a multi-band, multi-mode smartcard operating as a bridge between two communication protocols.

FIG. 8A is a flowchart illustrating exemplary steps for a multi-band, multi-mode smartcard operating as a bridge between two communication protocols. The exemplary steps may begin with step 802 in which the smartcard 102 may connect to the near-field AP 104. In step 804, the smartcard 102 may receive data from the AP 104 via the near-field radio 214. In step 806, the smartcard 102 may transcode the received data. The transcoding may comprise, for example, decapsulating, encapsulating, decoding, encoding, demodulating, modulating, decrypting, encrypting, and/or any other data processing operations to convert the data from a format suitable for communication via the near-field radio 202 to a format suitable for communication via the far-field radio 208. In step 808, the transcoded data may be transmitted via the far-field radio 208.

Figure 8B:
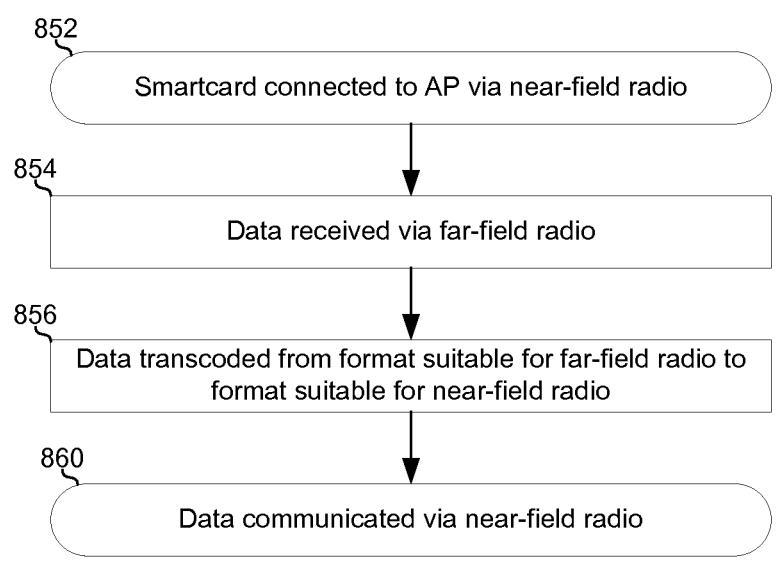
FIG. 8B is a flowchart illustrating exemplary steps for a multi-band, multi-mode smartcard operating as a bridge between two communication protocols.

FIG. 8B is a flowchart illustrating exemplary steps for a multi-band, multi-mode smartcard operating as a bridge between two communication protocols. The exemplary steps may begin with step 852 in which the smartcard 102 may connect to the near-field AP 104. In step 854, the smartcard 102 may receive data via the far-field radio 208. In step 856, the smartcard 102 may transcode the received data. The transcoding may comprise, for example, decapsulating, encapsulating, decoding, encoding, demodulating, modulating, decrypting, encrypting, and/or any other data processing operations to convert the data from a format suitable for communication via the far-field radio 208 to a format suitable for communication via the near-field radio 202. In step 858, the transcoded data may be transmitted to the AP 104 via the near-field radio 202.

The following is a non-exhaustive list of some applications of the smartcard 102.

The smartcard 102 may be used to view the status of upcoming trains, buses, or other transportation. For example, the smartcard 102 may display to see how many seats are available, and whether the transportation is running on time.

A user of the smartcard 102 may "announce" that he or she is beginning to walk towards the transportation. The smartcard 102 and/or associated servers/terminals may compute the location of the user. This location information may be used to share with other people preparing to leave for the train or bus and inform their decision about when to leave.

A user of the smartcard 102 may "schedule" his or her seat on the train or bus. This information may be conveyed (e.g., via servers and/or terminals in communication with the smartcard 102) to the transportation operators and/or other travelers, such that schedules and capacity can be adjusted/optimized accordingly.

A user of the smartcard 102 may pay for his or her seat on the transportation by using one or more radios of the smartcard 102.

A user of the smartcard 102 may learn who else might be on the train or bus that he or she knows. P2P messaging capability between smartcards may allow them to arrange to meet somewhere.

The smartcard 102 may be utilized as an identification card/badge. A photo of the user of the smartcard 102 may be displayed on the display 222, and the display be utilized to confirm the identity of the smartcard holder. The display 222 could display multiple headshots, body shots, etc. The photo may be updated periodically and/or upon certain events. For example, a new photo may be taken each time the holder smartcard 102 enters a location. An always-current photo may make it easier to compare the photo on the smartcard 102 to the person carrying/presenting the smartcard 102. Similarly, the display 222 could flash and/or display some other indication that the smartcard 102 is expired, has been lost, etc.

The smartcard 102 could have an image or imprint of its owner's fingerprint on it and the person carrying/presenting the smartcard 102 may be required to provide his finger such that his print can be compared to the print on the smartcard 102.

The various methods of authenticating a user/holder of the smartcard 102 may be combined with an IT asset, manufacturing asset, vehicle, or other asset to control access to the asset. For example, first the holder of the smartcard 102 may authenticate that they are who they say they are, then they gain access to the asset. Servers and/or terminals in communication with the smartcard 102 may log the association of the smartcard 102 and asset, and may report the association to a host application. The host application may ensure that the holder of the smartcard 102 should have access to the asset.

The smartcard 102 may be used instead of car keys to gain access or turn on the ignition to your car.

The smartcard 102 may be used as a credit or debit card and the display 222 may display, for example, an outstanding balance, recent transactions, and/or an award points balance. In an exemplary embodiment of the invention, the smartcard 102 may function as multiple cards, and the display 222 can show a different image for each of the cards. That is, a user can just shuffle through different images of different credit cards to select the card that he desires to use for payment. The display 222 could display a current image of the cardholder when the smartcard 102 is presented as payment.

The display 222 could display a stock ticker and enable a user to initiate trades of securities.

The display 222 can display a barcode which could be scanned by, for example, a payment terminal or other portable device.

The smartcard 102 may serve as a driver's license with more detailed information (e.g., driving history) displayed on the display 222.

The smartcard 102 may serve as a passport.

The smartcard 102 may serve as an insurance card, and/or a patient's "chart" at a hospital. The display 222 may display, for example, allergies, current medications, and/or treatment history.

The smartcard 102 may serve as a "loyalty card" for retail stores. The display 222 may display coupons, advertisements, etc.

The smartcard 102 may be operable to participate in P2P messaging. The display 222 may, for example, display the names and/or photos associated with other nearby smartcards. The smartcard 102 may be operable to send and/or receive email, SMS messages, and/or MMS messages.

The display 222 may be operable to display native ISO 18000-7 text and/or numeric messages.

The smartcard 222 may enable a user to participate in various games such as lottery games, scavenger hunts, races, etc.

In an exemplary embodiment of the invention, an ISO 7816 compliant smartcard (e.g., the smartcard 102) may comprise a near-field radio (e.g., radio 202) operable to communicate wirelessly, a far-field radio (e.g., radio 208) operable to communicate wirelessly, and a contact-based radio (e.g., radio 214) operable to communicate via one or more metal contacts (e.g., contacts 103) of the smartcard. The smartcard may be operable to receive data via a first one of the far-field radio, the near-field radio, and the contact-based radio. The smartcard may be operable to transmit the received data via a second one of the far-field radio, the near-field radio, and the contact-based radio. The smartcard may be operable to transcode the received data prior to the transmitting the received data via the second one of the far-field radio, the near-field radio, and the contact-based radio.

The smartcard may be operable to receive the data via the contact-based radio, and transmit the received data via the far-field radio. The smartcard may be operable to receive the data via the far-field radio, and transmit the received data via the contact-based radio. The smartcard may be operable to transmit a first portion (e.g., a first one or more packets) of a message via a first one of the near-field radio, the far-field radio, and the contact-based radio, and transmit a second portion (e.g., a second one or more packets) of a message via a second one of the near-field radio, the far-field radio, and the contact-based radio. The smartcard may be operable to receive a first portion (e.g., a second one or more packets) of a message via a first one of the near-field radio, the far-field radio, and the contact-based radio, and receive a second portion (e.g., a second one or more packets) of a message via a second one of the near-field radio, the far-field radio, and the contact-based radio.

The smartcard may be operable to transmit a message via a first one of the near-field radio, the far-field radio, and the contact-based radio, and receive an acknowledgment of the message via a second one of the near-field radio, the far-field radio, and the contact-based radio. The smartcard may be operable to receive parameters via a first of the near-field radio, the far-field radio, and the contact-based radio, and configure a second of the near-field radio, the far-field radio, and the contact-based radio based on the received parameters. The smartcard may comprise a memory. A first portion of the memory may only be accessible via a first one of the near-field radio, the far-field radio, and the contact-based radio. A second portion of the memory may only be accessible via a second one of the near-field radio, the far-field radio, and the contact-based radio.

The smartcard may be operable to receive information from a particular device via a first one of the near-field radio, far-field radio, and the contact-based radio, and determine whether to communicate with the particular device via a second one of the near-field radio, far-field radio, and the contact-based radio based on the received information. The determination of whether to communicate with the particular device comprises one or both of: determining an authenticity of the particular device, and determining an authorization of the particular device.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for a multi-band, multi-mode smartcard Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A communication system comprising:
    an ISO 7816 compliant smartcard, said smartcard comprising:
        a near-field radio operable to communicate wirelessly;
        a far-field radio operable to communicate wirelessly; and
        a contact-based radio operable to communicate via one or more metal contacts of said smartcard, wherein said smartcard is operable to:
            receive a first portion of a secure message via a first one of said far-field radio, said near-field radio, and said contact-based radio; and
            receive a second portion of said secure message via a second one of said far-field radio, said near-field radio, and said contact-based radio, wherein neither one of said first portion and said second portion is useful without the other one of said first portion and said second portion.

2. The communication system of claim 1, wherein said smartcard is operable to:
    receive said first portion of said secure message via said contact-based radio; and
    receive said second portion of said secure message via said far-field radio.

3. The communication system of claim 1, wherein said smartcard is operable to:
    receive said first portion of said secure message via said far-field radio; and receive said second portion of said secure message via said near-field radio.

4. The communication system of claim 1, wherein said smartcard is operable to:
transmit a first portion of an outgoing message via a first one of said near-field radio, said far-field radio, and said contact-based radio; and
transmit a second portion of said outgoing message via a second one of said near-field radio, said far-field radio, and said contact-based radio.

5. The communication system of claim 1, wherein said smartcard is operable to:
transmit an outgoing message via a first one of said near-field radio, said far-field radio, and said contact-based radio; and
receive an acknowledgment of said outgoing message via a second one of said near-field radio, said far-field radio, and said contact-based radio.

6. The communication system of claim 1, wherein said smartcard is operable to:
receive parameters via a first of said near-field radio, said far-field radio, and said contact-based radio; and
configure, based on said received parameters, one or more of: modulation, frequency, transmit levels, and encoding used by a second of said near-field radio, said far-field radio, and said contact-based radio.

7. The communication system of claim 1, wherein:
said smartcard comprises a memory;
a first portion of said memory is only accessible via a first one of said near-field radio, said far-field radio, and said contact-based radio; and
a second portion of said memory is only accessible via a second one of said near-field radio, said far-field radio, and said contact-based radio.

8. A method comprising:
in an ISO 7816 compliant smartcard, said smartcard comprising, a memory, a near-field radio operable to communicate wirelessly, a far-field radio operable to communicate wirelessly, and a contact-based radio operable to communicate via one or more metal contacts of said smartcard:
receiving data via a first one of said far-field radio, said near-field radio, and said contact-based radio; and
transmitting said received data via a second one of said far-field radio, said near-field radio, and said contact-based radio.

9. The method of claim 8, comprising:
transcoding said received data prior to said transmitting said received data via said second one of said far-field radio, said near-field radio, and said contact-based radio.

10. The method of claim 9, comprising:
receiving said data via said contact-based radio; and
transmitting said transcoded data via said far-field radio.

11. The method of claim 9, comprising:
receiving said data via said far-field radio; and
transmitting said transcoded data via said contact-based radio.

12. The method of claim 8, comprising:
transmitting a first portion of a message via a first one of said near-field radio, said far-field radio, and said contact-based radio; and
transmitting a second portion of said message via a second one of said near-field radio, said far-field radio, and said contact-based radio.

13. The method of claim 8, comprising:
receiving a first portion of a message via a first one of said near-field radio, said far-field radio, and said contact-based radio; and
receiving a second portion of said message via a second one of said near-field radio, said far-field radio, and said contact-based radio.

14. The method of claim 8, comprising:
transmitting a message via a first one of said near-field radio, said far-field radio, and said contact-based radio; and
receiving an acknowledgment of said message via a second one of said near-field radio, said far-field radio, and said contact-based radio.

15. The method of claim 8, comprising:
receiving parameters via a first of said near-field radio, said far-field radio, and said contact-based radio; and
configuring, based on said received parameters, one or more of: modulation, frequency, transmit levels, and encoding used by a second of said near-field radio, said far-field radio, and said contact-based radio.

16. The method of claim 8, wherein:
a first portion of said memory is only accessible via a first one of said near-field radio, said far-field radio, and said contact-based radio; and
a second portion of said memory is only accessible via a second one of said near-field radio, said far-field radio, and said contact-based radio.

17. A communication system comprising:
an ISO 7816 compliant smartcard, said smartcard comprising:
a near-field radio operable to communicate wirelessly;
a far-field radio operable to communicate wirelessly;
a contact-based radio operable to communicate via one or more metal contacts of said smartcard; and
a memory having a first partition accessible only via a first one of said near-field radio, said far-field radio, and said contact-based radio, and a second partition accessible via a second one of said near-field radio, said far-field radio, and said contact-based radio, wherein:
security data for authenticating and/or authorizing a communication between said smartcard and another device is stored in said first partition, such that said communication may occur via said second one of said near-field radio, said far-field radio, and said contact-based radio only after said other device is authenticated based on said security data stored in said first partition and data received from said other device via said first one of said near-field radio, said far-field radio, and said contact-based radio.

* * * * *